Patented May 30, 1944

2,350,300

UNITED STATES PATENT OFFICE 2,350,300

CELLULOSE TRIACETATE COMPOSITION

Charles Bogin, Terre Haute, Ind., assignor to Commercial Solvents Corporation, Terre Haute, Ind., a corporation of Maryland No Drawing. Application April 24, 1943, Serial No. 484,495

7 Claims. (Cl. 106—189)

My invention relates to cellulose acetate compositions and particularly to such compositions comprising the relatively insoluble form of cellulose acetate, commonly known in the art as cellulose triacetate, one or more of the lower chloronitroalkanes and a lower saturated aliphatic alcohol.

Cellulose acetate is produced commercially in a number of grades which differ in their degree of acetylation. In the ordinary processes by which cellulose acetate is manufactured, it is first produced as a highly esterified material possessing an acetic acid content of approximately 62 per cent and in this form is known as cellulose triacetate. This product, however, has been found to be soluble only in a limited number of solvents, the majority of which possess certain critical disadvantages, and, as a result, the application of cellulose triacetate compositions has been restricted to a relatively narrow field.

Cellulose triacetate coating compositions have previously been prepared by utilizing as a solvent, a mixture consisting of approximately 70 per cent nitro methane and 30 per cent of a lower aliphatic alcohol, or mixtures in which approximately half of the alcohol content is replaced by an aromatic hydrocarbon such as benzene or toluene. Such solvent mixtures will dissolve cellulose triacetate satisfactorily and the resulting solutions produced are in most instances perfectly clear. Notwithstanding this fact, however, such compositions leave much to be desired, since the range of nitromethane-alcohol proportions permissible from the standpoint of solubility is very narrow, and, inasmuch as these two volatile liquids do not evaporate at the same rate, the necessary solvent balance is rapidly destroyed during the drying operation leading to precipitation of the cellulose triacetate which results in the formation of a cloudy film.

It is an object of the present invention to provide solvent mixtures easily capable of maintaining the proper solvent balance throughout the drying of the applied cellulose triacetate film and thereby avoid the procurement of cloudy and unsatisfactory films. A further object of the present invention is to provide solvent mixtures for cellulose triacetate to produce solutions thereof which are particularly suitable for the extrusion of fibers and for use as coating materials, airplane dopes and the like. Additional objects of the present invention will be apparent from the description which follows.

The lower mono-chloronitroalkanes, per se, are not solvents for cellulose triacetate, i. e., grades of cellulose acetate having an acetic acid content ranging from about 58 to 62 per cent. I have found, however, that when such materials are mixed with suitable proportions of a lower aliphatic monohydric alcohol, they constitute excellent solvents for the aforesaid grades of cellulose acetate.

The mono-chloronitroalkanes suitable for use, in accordance with my invention, constitute for the most part those having the chloro and nitro group on the same primary carbon atom. However, it is to be specifically understood that this invention is not restricted to the use of such materials, but may likewise include the application of other lower chloronitroalkanes as well. As examples of such materials, there may be mentioned, nitrochloromethane, 1 - nitro - 1 - chloroethane, 1-nitro-1-chloropropane, 2-nitro-2-chloropropane, 1-nitro-3-chloropropane, 1-nitro-1-chlorobutane, 2-nitro-2-chlorobutane, 1-nitro-1-chloro-2-methylpropane, and the like. The alcohols that may be employed are, as indicated above, those of the lower aliphatic monohydric type and as preferred examples of such materials there may be mentioned, methanol, ethanol, isopropyl alcohol, n-propyl alcohol, the butyl alcohols, and the like. The particular alcohol utilized in any given instance will depend largely upon the chloronitroalkane with which it is combined as well as upon the character of the film desired.

One of the principal and outstanding advantages of the chloronitroalkane-alcohol solvent mixtures of the present invention, is their exceptionally high tolerance for the nitroparaffins, such as nitromethane, nitroethane, 1-nitropropane, 2-nitropropane, 1-nitrobutane and the like, and for certain of the various aromatic hydrocarbons, such as benzene and toluene or mixtures of such nitroparaffins and aromatic hydrocarbons.

The present invention will be further illustrated by the following specific examples:

Example I

Cellulose triacetate having an acetic acid content of 61.0 per cent was added in a ratio of 10 grams per 100 cc. of a solvent mixture consisting of 50 parts by volume of 1-nitro-1-chloropropane, 30 parts by volume of 1-nitropropane, and 20 parts by volume of ethyl alcohol. The resulting mixture was heated to a temperature of about 70° C. in order to completely dissolve the cellulose triacetate. The solution thus obtained when applied to glass plates at room or elevated temperatures produced a clear, tough and water resistant film.

Example II

To a solvent mixture consisting of 40 parts by volume of 1-nitro-1-chloroethane, 15 parts by volume of ethyl alcohol, 20 parts by volume of nitroethane, and 25 parts by volume of toluene, cellulose triacetate, having an acetic acid content of 60.5 per cent, was added in a ratio of 10 grams per 100 cc. of solvent mixture. After heating this mixture to a temperature of approximately 70° C., a clear solution was obtained which when applied to a smooth surface, at room or elevated temperature, produced a clear, tough, and water resistant film of cellulose triacetate.

Example III

Cellulose triacetate, having an acetic acid content of 61.2 per cent, was added in a ratio of 15 grams per 100 cc. of a solvent mixture consisting of 50 parts by volume of chloronitromethane, 20 parts by volume of methanol, 10 parts by volume of 1-nitropropane and 20 parts by volume of toluene. The solution thus obtained was clear, and when applied to a smooth surface formed a cloudy, tough and water-resistant film of cellulose triacetate. A solution capable of producing clear films was prepared by using nitromethane instead of the 1-nitropropane of the above formula.

Example IV

To a solvent mixture consisting of 75 parts by volume of 1-nitro-1-chloropropane and 25 parts by volume of ethyl alcohol, cellulose triacetate, having an acetic acid content of 59.6 per cent, was added in a ratio of 8 grams per 100 cc. of solvent mixture. As a result, a perfectly clear solution was produced and when the latter was applied to glass panels at room temperature, a clear, tough and water-resistant film of cellulose triacetate was formed.

The above examples, of course, are to be interpreted as illustrative of solvent mixtures and cellulose triacetate compositions included within the scope of the present invention, and are to be in no sense construed as restricting said invention to the particular solvent mixtures and cellulose triacetate compositions specifically disclosed. One skilled in the art may readily modify the above examples by substituting other solvent components in accordance with the foregoing description. It will likewise be apparent that compositions of the type referred to above may readily be modified by the addition of compatible plasticizers or resins, pigments, dyes or other ingredients commonly employed for the production of compositions for coating materials for the deposition of films, or for other known uses in the art. Also numerous equivalents may be employed for the materials specifically mentioned in the examples. It is to be understood therefore that the use of any equivalents or modifications of procedure, which would naturally occur to one skilled in the art, is included within the scope of my invention.

My invention now having been described, what I claim is:

1. A composition of matter, comprising cellulose triacetate, having an acetic acid content ranging from about 58 to 62 per cent and a solvent mixture comprising a lower monochloromononitroalkane and a lower aliphatic monohydric alcohol, the components of said solvent mixture being in such proportions as to render the mixture easily capable of maintaining the cellulose triacetate in a dissolved state throughout the drying process when said composition is applied to a smooth surface.

2. A composition of matter comprising, cellulose triacetate, having an acetic acid content ranging from about 58 to 62 per cent and solvent mixture comprising a lower 1-nitro-1-chloroalkane and a lower aliphatic monohydric alcohol, the components of said solvent mixture being in such proportions as to render the mixture easily capable of maintaining the cellulose triacetate in a dissolved state throughout the drying process when said composition is applied to a smooth surface.

3. A composition of matter comprising cellulose triacetate and a solvent mixture comprising 1-nitro-1-chloropropane and a lower aliphatic monohydric alcohol, the components of said mixture being in such proportion as to render the same easily capable of maintaining the cellulose triacetate in a dissolved state throughout the drying process when said composition is applied to a smooth surface.

4. A composition of matter comprising cellulose triacetate and a solvent mixture comprising 1-nitro-1-chloroethane and a lower aliphatic monohydric alcohol, the components of said mixture being in such proportion as to render the same easily capable of maintaining the cellulose triacetate in a dissolved state throughout the drying process when said composition is applied to a smooth surface.

5. A composition of matter comprising cellulose triacetate and a solvent mixture comprising monochloronitromethane and a lower aliphatic monohydric alcohol, the components of said mixture being in such proportions as to render the same easily capable of maintaining the cellulose triacetate in a dissolved state throughout the drying process when said composition is applied to a smooth surface.

6. A composition of matter, comprising cellulose triacetate, having an acetic acid content ranging from about 58 to 62 per cent and a solvent mixture comprising an aromatic hydrocarbon, a lower 1-nitro-1-chloroalkane, and a lower aliphatic monohydric alcohol, the components of said solvent mixture being in such proportions as to render the mixture easily capable of maintaining the cellulose triacetate in a dissolved state throughout the drying process when said composition is applied to a smooth surface.

7. A composition of matter, comprising cellulose triacetate, having an acetic acid content ranging from about 58 to 62 per cent and a solvent mixture comprising toluene, a lower 1-nitro-1-chloroalkane and a lower aliphatic monohydric alcohol, the components of said solvent mixture being in such proportions as to render the mixture easily capable of maintaining the cellulose triacetate in a dissolved state throughout the drying process when said composition is applied to a smooth surface.

CHARLES BOGIN.